(12) United States Patent
Labyedh et al.

(10) Patent No.: US 10,374,218 B2
(45) Date of Patent: Aug. 6, 2019

(54) METHODS FOR FORMING LITHIUM MANGANESE OXIDE LAYERS

(71) Applicants: IMEC VZW, Leuven (BE); Katholieke Universiteit Leuven, KU LEUVEN R&D, Leuven (BE)

(72) Inventors: Nouha Labyedh, Menzel Bouzelfa-Nabeul (TN); Marina Yurievna Timmermans, Leuven (BE); Philippe Vereecken, Liege (BE)

(73) Assignees: IMEC VZW, Leuven (BE); Katholieke Universiteit Leuven, KU LEUVEN R&D, Leuven (BE)

( * ) Notice: Subject to any disclaimer, the term of this patent is extended or adjusted under 35 U.S.C. 154(b) by 260 days.

(21) Appl. No.: 15/339,577

(22) Filed: Oct. 31, 2016

(65) Prior Publication Data

US 2017/0125789 A1     May 4, 2017

(30) Foreign Application Priority Data

Nov. 2, 2015  (EP) .................................. 15192543

(51) Int. Cl.
  *C25D 9/04*  (2006.01)
  *C25D 17/10*  (2006.01)
  (Continued)

(52) U.S. Cl.
  CPC .............. *H01M 4/045* (2013.01); *C25D 9/04* (2013.01); *C25D 17/10* (2013.01);
  (Continued)

(58) Field of Classification Search
  None
  See application file for complete search history.

(56) References Cited

U.S. PATENT DOCUMENTS

2012/0282164 A1    11/2012  Choi
2013/0164611 A1*   6/2013   Nanba ..................... H01M 4/70
                                                           429/211

FOREIGN PATENT DOCUMENTS

| CN | 103904321 A | 7/2014 |
| EP | 1303460 B1 | 3/2006 |
| JP | 2001011611 A * | 1/2001 |
| JP | 2001011611 A | 1/2001 |

(Continued)

OTHER PUBLICATIONS

European Search Report, European Patent Application No. 15192543. 5, dated Apr. 8, 2016, 9 pages.

(Continued)

*Primary Examiner* — Maria Laios
(74) *Attorney, Agent, or Firm* — McDonnell Boehnen Hulbert & Berghoff LLP

(57) ABSTRACT

A method is provided for forming a porous, electrochemically active lithium manganese oxide layer on a substrate, the method comprising: depositing a porous manganese oxide layer on the substrate; providing a Li containing layer on the porous manganese oxide layer; and afterwards performing an annealing step at a temperature in the range between 200° C. and 400° C., thereby inducing a solid-state reaction between the porous manganese oxide layer and the Li containing layer. The method may further comprise, before depositing the porous manganese oxide layer: depositing a seed layer on the substrate. A method of the present disclosure may be used for forming electrode layers of lithium-ion batteries.

20 Claims, 8 Drawing Sheets

(51) Int. Cl.
  *H01M 4/1391* (2010.01)
  *H01M 4/505* (2010.01)
  *H01M 4/131* (2010.01)
  *H01M 4/04* (2006.01)
  *H01M 4/02* (2006.01)
  *H01M 4/66* (2006.01)
  *H01M 10/0525* (2010.01)
  *H01M 10/0585* (2010.01)

(52) U.S. Cl.
  CPC ....... *H01M 4/0452* (2013.01); *H01M 4/0471* (2013.01); *H01M 4/131* (2013.01); *H01M 4/1391* (2013.01); *H01M 4/505* (2013.01); *H01M 10/0525* (2013.01); *H01M 4/661* (2013.01); *H01M 4/664* (2013.01); *H01M 10/0585* (2013.01); *H01M 2004/021* (2013.01); *H01M 2220/30* (2013.01)

(56) References Cited

FOREIGN PATENT DOCUMENTS

| | | |
|---|---|---|
| JP | 2002260654 A | 9/2002 |
| JP | 3858088 B2 | 12/2006 |
| JP | 2008282731 A | 11/2008 |
| WO | 2013/002486 A2 | 1/2013 |
| WO | 2013/012334 A1 | 1/2013 |

OTHER PUBLICATIONS

Hwang, K.H. et al., "Fabrication and Characterization of an Li—Mn—O Thin-Film Cathode for Rechargeable Lithium Microbatteries", Journal of Power Sources, vol. 54, No. 2, Apr. 1, 1995, pp. 224-227.

Shokoohi, F.K. et al., "Low Temperature LiMn2O4 Spinal Films for Secondary Lithium Batteries", Journal of the Electrochemical Society, vol. 139, No. 7, Jul. 1, 1992, pp. 1845-1849.

\* cited by examiner

METHODS FOR FORMING LITHIUM MANGANESE OXIDE LAYERS

CROSS-REFERENCE TO RELATED APPLICATIONS

This application claims the benefit of priority of European Patent Application no. 15192543.5, filed Nov. 2, 2015, which is hereby incorporated herein by reference in its entirety.

BACKGROUND OF THE DISCLOSURE

Field of the Disclosure

The present disclosure is related to methods for forming conformal, porous, electrochemically active lithium manganese oxide ($Li_xMn_yO_z$) layers and to lithium manganese oxide layers thus obtained.

The present disclosure is further related to methods for forming conformal, porous lithium manganese oxide electrode layers, and to methods for fabricating lithium-ion batteries having a conformal, porous lithium manganese oxide layer as an electrode layer.

Technical Background

Lithium manganese oxide ($Li_xMn_yO_z$) has intensively been studied as an electrode material for lithium-ion batteries and is commercially used. It has a high redox potential, a competitive capacity (145 mAh/g) when cycled between 3.5 and 4.5 V versus $Li^+/Li$ and a low toxicity.

Lithium-ion batteries are typically particle-based and contain a particle-based active electrode, e.g. a particle-based lithium manganese oxide electrode. However, thin film lithium-ion batteries, based on a thin film stack and having a thin film electrode, in particular solid-state thin film lithium-ion batteries, are gaining more and more interest. In order to increase the substrate surface area and hence increase the battery capacity of such thin film batteries, the complete thin film stack may be coated on a 3D structure such as for example on a substrate comprising an array of high aspect-ratio micro-pillars.

Different deposition techniques for thin films of lithium manganese oxide have been proposed in literature, such as RF-sputtering, electrospray deposition and pulsed laser deposition. These deposition techniques are known to be rather expensive and their use does not result in a good conformality of the deposited film, which is a challenge when working with high aspect-ratio structures (e.g. 3D silicon micro-pillars).

Moreover, after the lithium manganese oxide thin film deposition, annealing at high temperature, i.e. at a temperature of at least 700° C., typically at a temperature of 750° C. to 850° C., is required to crystallize the film and to make it electrochemically active, i.e. capable of Li insertion and extraction. This annealing causes the formation of a very dense and crystalline film. The high density of the film leads to non-released mechanical strain during battery charging and discharging, which can cause the formation of cracks in the lithium manganese oxide electrode layer, loss of contact with an underlying current collector and, in case of a solid-state battery, to cracks in the solid electrolyte layer. Annealing at high temperature may also affect the underlying layers such as the current collector and/or the substrate.

SUMMARY OF THE DISCLOSURE

In certain aspects, the present disclosure provides methods for forming conformal, porous, electrochemically active layers of lithium manganese oxide (LMO, $Li_xMn_yO_z$) on a substrate, for example for use as an electrode in a thin film solid-state battery.

In certain aspects, the present disclosure provides methods for forming conformal, porous, electrochemically active layers of lithium manganese oxide (LMO, $Li_xMn_yO_z$) on a substrate, wherein the methods can be performed at low temperatures, e.g. at temperatures not exceeding 400° C.

In certain aspects, the disclosure relates to a method for forming a porous, electrochemically active lithium manganese oxide ($Li_xMn_yO_z$) layer on a substrate, wherein the method comprises: depositing, e.g. electrochemically depositing, a porous manganese oxide ($Mn_vO_w$) layer on the substrate; providing a Li containing layer on the porous manganese oxide layer; and afterwards performing a thermal treatment (annealing step) at a temperature in the range between 200° C. and 400° C., for example between 300° C. and 400° C. In example embodiments, the thermal treatment may be performed at a temperature in the range between 330° C. and 370° C., thereby inducing a solid-state reaction between the porous manganese oxide layer and the Li containing layer. This solid-state reaction results in the formation of the porous, electrochemically active lithium manganese oxide layer on the substrate.

In certain embodiments of the present disclosure, the $Li_xMn_yO_z$ layer may, for example, have a spinel structure. In certain embodiments of the present disclosure, the $Li_xMn_yO_z$ layer may, for example, be a layer with $0<x<2$ for $y=2$, and z equal to about 2y (e.g. z in the range between 1.8y and 2.2 y). The lithium manganese oxide layer ($Li_xMn_yO_z$ layer) may, for example, be a spinel $Li_xMn_2O_4$ layer with x in the range between 0 and 2 ($0<x<2$).

In certain embodiments of the present disclosure, the $Mn_vO_w$ layer may, for example, be a layer with $v=1$ and with w in the range between 1.9 and 2.1. However, the present disclosure is not limited thereto, and for example $Mn_2O_3$ or MnO or a mixture thereof may alternatively be used. Further, the valence of Mn may be converted by post deposition treatment. For example, upon deposition the manganese oxide layer may contain $Mn_2O_3$, which may be converted to $MnO_2$ during the annealing step. In certain embodiments of the present disclosure, the porous manganese oxide layer may, for example, be a porous $MnO_2$ layer.

In a method according to certain embodiments of the present disclosure, depositing the porous manganese oxide layer may comprise electrochemically depositing the porous manganese oxide layer, for example by galvanostatic deposition. However, the present disclosure is not limited thereto and in other embodiments potentiostatic deposition may be used. Electrochemically depositing the manganese oxide layer on the substrate can in certain embodiments be advantageous in that the manganese oxide layer can be deposited conformally, i.e. with a uniform thickness and substantially (or even exactly) following the topography of the underlying substrate. The manganese oxide layer thickness may be, for example, in the range between 10 nm and 3 micrometer, for example in the range between 50 nm and 2 micrometer, the present disclosure not being limited thereto.

However, the present disclosure is not limited to methods in which the porous manganese oxide layer is deposited electrochemically. In other embodiments, other methods may be used for depositing the porous manganese oxide layer, such as, for example, chemical-solution or sol-gel deposition, chemical vapour deposition (CVD) or molecular layer deposition (MLD) using an organic additive to render the layer porous, or pulsed laser deposition.

In a method according to certain embodiments of the present disclosure, the deposited, e.g. electrochemically deposited, porous manganese oxide layer may, for example, have a porosity in the range between 40% and 60% and/or a pore size in the range between 2 nm and 20 nm, e.g. between 5 nm and 10 nm, the present disclosure not being limited thereto.

Providing the Li containing layer on the porous manganese oxide layer may, for example, comprise providing a $Li_2CO_3$ layer on the porous manganese oxide layer, the present disclosure not being limited thereto. Examples of methods that may be used for providing the Li containing layer are spin coating, spray coating, slot-die coating, drop casting and Atomic Layer Deposition, the present disclosure not being limited thereto.

The thermal treatment or annealing step may, for example, have a duration of 5 minutes to 24 hours, for example 5 minutes to 10 hours, for example 5 minutes to 5 hours, or 10 minutes to 3 hours, the present disclosure not being limited thereto. The duration of the thermal treatment (annealing time) may be adapted to the thickness of the manganese oxide layer and/or to the thickness of the Li containing layer. The thicker the layers, the longer the annealing time. The duration of the thermal treatment (annealing time) also depends on the annealing temperature. In certain aspects of the disclosure, the lower the annealing temperature, the longer the annealing time. For example, it was experimentally found that for a manganese oxide layer thickness of 250 nm a thermal treatment having a duration of 2 hours is suitable for a an annealing temperature in the range between 330° C. and 370° C. However, in the lower temperature range, such as e.g. for an annealing temperature of 250° C., a much longer annealing time (several hours) may be needed. The annealing step may be done in air or in an inert atmosphere such as a nitrogen atmosphere or an argon atmosphere. The annealing may be done at ambient pressure or at a reduced pressure.

In certain embodiments of the present disclosure, the substrate may be a planar substrate or a non-planar substrate (micro-structured substrate or 3D substrate). The substrate may, for example, comprise a plurality of high aspect-ratio features such as a plurality of micro-pillars or a plurality of micro-trenches. The aspect-ratio of these features may for example be in the range between 1 and 1000, e.g. between 20 and 250, the present disclosure not being limited thereto. In the context of solid-state batteries, using a substrate with such high aspect-ratio features can be advantageous in that it results in a significant increase in battery capacity.

In certain embodiments of the present disclosure, the substrate may comprise a current collector. The substrate may, for example, consist of a stack of different layers, e.g. comprising a current collector provided on a silicon wafer or on a foil such as a flexible foil. The current collector may, for example, comprise TiN, carbon, Pt, Ni, Al, stainless steel or carbon nanotubes, the present disclosure not being limited thereto. The thickness of the current collector layer may, for example, be in the range between 10 nm and 250 nm, the present disclosure not being limited thereto. The current collector layer may be a multilayer stack, such as e.g. a two-layer stack comprising a TiN layer and a Ni layer coated on the TiN layer.

In certain embodiments of the present disclosure, before electrochemically depositing the porous manganese oxide layer, a thin seed layer or barrier layer may be deposited on the substrate, e.g. on the current collector being part of the substrate. The thin seed layer or barrier layer may, for example, have a thickness in the range between 1 nm and 10 nm, e.g. in the range between 3 nm and 5 nm, the present disclosure not being limited thereto. The thin seed layer may, for example, be a thin, dense manganese oxide layer, deposited by a method other than electrochemical deposition, such as, for example, Atomic Layer Deposition or Pulsed Laser Deposition, the present disclosure not being limited thereto. In the context of the present disclosure, a dense layer is a layer being substantially non-porous or having a very low porosity, such as a porosity lower than 5%, e.g. lower than 3%, e.g. lower than 1%. The porous manganese oxide layer is then deposited, e.g. electrochemically deposited, on the thin seed layer or barrier layer. This approach may advantageously be used to reduce or avoid oxidation of the substrate during electrochemical deposition, for example when an upper layer of the substrate is an oxidizable layer (restrictive layer) such as a TiN layer or an Al layer. Oxidation of the substrate may inhibit electrochemical deposition of the porous manganese oxide layer. In addition, this approach may advantageously be used to promote adhesion of the porous manganese oxide layer to the substrate. In general, the better the adhesion, the thicker the porous manganese oxide layer that can be deposited without delamination, e.g. delamination due to inherent film stress. For example, it was found that a manganese oxide film deposited from an acid manganese sulfate bath easily delaminates from noble metals such as platinum for a film thickness above 150 nm to 200 nm, whereas delamination is observed only from a film thickness of 400 nm to 500 nm for surfaces coated with a 30-70 nm thick layer of CVD graphitic carbon and for a film thickness above 1000 nm for a surface coated with a 3 nm to 4 nm thick dense ALD $MnO_2$ film.

The disclosure further relates to a method for fabricating a lithium-ion battery, wherein the method comprises forming a porous, electrochemically active lithium manganese oxide layer according to a method as described herein, the lithium manganese oxide layer being an electrode layer of the lithium-ion battery.

Certain embodiments of the present disclosure can be advantageous in that they can be performed at a relatively low cost.

Certain embodiments of the present disclosure can be advantageous in that they are compatible with existing manufacturing methods.

Certain embodiments of the present disclosure can be advantageous in that they allow the formation of lithium manganese oxide electrode layers with good electrochemical properties at low temperatures, for example, at temperatures not exceeding 400° C. As compared to known methods for forming lithium manganese oxide electrode layers, which typically require annealing at a temperature exceeding 700° C., such low temperatures as described herein can be advantageous in that the lithium manganese oxide electrode layers can be deposited on a wider range of substrates. For example, methods according to certain embodiments of the present disclosure can be advantageous in that they allow the formation of lithium manganese oxide electrode layers with good electrochemical properties on substrates that cannot withstand temperatures higher than 700° C., such as for example substrates comprising Al, e.g. substrates comprising an Al current collector.

Certain embodiments of the present disclosure can be advantageous in that they allow the formation of thin lithium manganese oxide layers with good conformality, i.e. layers having a uniform thickness and substantially (or even exactly) following the topography of the underlying substrate. Therefore, certain methods of the present disclosure may advantageously be used for forming such layers on 3D structures (e.g. in a process for fabricating 3D battery architectures), such as, for example, on a structure comprising a plurality of high aspect-ratio micro-pillars or a plurality of high aspect-ratio micro-trenches or a structure comprising a plurality of nanowires or a nanowire mesh. For example, the 3D structure may comprise an array of high aspect-ratio pillars, such as for example silicon pillars, e.g. silicon pillars coated with a current collector layer. The pillars may for example have a diameter in the range between 0.5 micrometer and 10 micrometer, a spacing of 1 micrometer to 20 micrometer and a height in the range between 10 micrometer and 200 micrometer, the present disclosure not being limited thereto. Using a substrate comprising a plurality of 3D microstructures can be advantageous in that it results in an increased battery capacity. Due to the substantially conformal deposition of the layers using a method according to certain embodiments of the present disclosure, the thickness of the layers is substantially the same on the 3D structures and in the recesses between such structures as well as on the sides of such structures.

Certain methods of the present disclosure can be advantageous in that the lithium manganese oxide layer is a porous layer. When used as an electrode layer of a thin film battery, such a porous layer can be advantageous in that it allows releasing mechanical strain occurring during charging and discharging of the battery, thus reducing the risk of crack formation.

Certain methods of the present disclosure may be used for forming an electrode of a thin film battery, e.g. a solid-state thin film battery. They may also be used for other applications, such as for example for forming a sensing layer in lithium-ion sensors or for forming an electrochromic layer in electrochromic devices.

The disclosure further relates to a composite structure comprising a substrate and a porous, electrochemically active lithium manganese oxide layer substantially conformally provided on said substrate, the substrate not withstanding temperatures higher than 700° C. The substrate may comprise a current collector, such as for example an Al current collector. The substrate may be a non-planar substrate, e.g. comprising a plurality of high aspect-ratio micro-pillars and/or a plurality of high aspect-ratio micro-trenches. A substrate may be identified as not being able to withstand a certain temperature if exposing the substrate to such a temperature would substantially change the properties (such as for example the mechanical properties, such as e.g. leading to softening or melting) of the substrate or of one of the layers or elements being part of the substrate. Such a composite structure may be fabricated using the methods described herein.

The disclosure further relates to a thin film lithium-ion battery comprising such a composite structure.

Certain advantages of various inventive aspects and embodiments of the disclosure have been described herein above. Of course, it is to be understood that not necessarily all such advantages may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects or advantages as may be taught or suggested herein. Further, it is understood that this summary is merely an example and is not intended to limit the scope of the disclosure. The disclosure, both as to organization and method of operation, together with features and advantages thereof, may best be understood by reference to the following detailed description when read in conjunction with the accompanying drawings.

Particular and preferred aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

Figure 1:
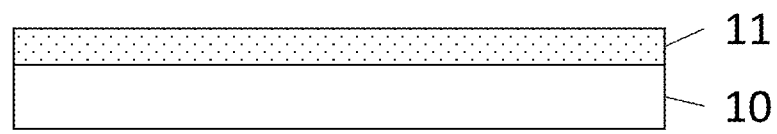
FIG. 1, FIG. 2, FIG. 3 and FIG. 4 illustrate examples of process steps of a method according to one embodiment of the present disclosure.

Any reference signs in the claims shall not be construed as limiting the scope of the present disclosure.

In the different drawings, the same reference signs refer to the same or analogous elements.

The drawings are only schematic and are non-limiting. In the drawings, the size of some of the elements may be exaggerated and not drawn on scale for illustrative purposes.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms top, bottom, over, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth in order to provide a thorough understanding of the disclosure and how it may be practiced in particular embodiments. However, it is understood that embodiments of the disclosure may be practiced without these specific details. In other instances, well-known methods, structures and techniques have not been shown in detail in order not to obscure an understanding of this description.

In one aspect, the present disclosure relates to methods for forming lithium manganese oxide thin films that may be used as an electrode layer, for example, a positive electrode or cathode layer, in thin film Li batteries and Li-ion batteries. Such batteries comprise a stack of an anode layer (first electrode layer), an electrolyte layer and a cathode layer (second electrode layer). At least the cathode layer is capable of reversible lithium ion insertion. A variety of negative electrodes or anode layers may be used, for example, a lithium insertion electrode, or a conversion electrode (e.g. $SnO_2$) or a lithium metal layer. Because of the difference in electrochemical potentials of the two electrodes, the transfer of lithium ions from the anode through the electrolyte into the cathode (discharge) delivers energy, whereas the reverse lithium ion transfer (charge) consumes energy. When the battery is being discharged, the lithium ions in the anode material (negative electrode) migrate to the cathode material (positive electrode), and a discharging current flows. When the battery is being charged, the lithium ions move into the opposite direction into their original positions in the materials and a charging current flows. The material that is the anode in discharge (negative electrode) becomes the cathode (positive electrode) when charging the battery. Herein further with anode material and cathode material are meant the materials that are the anodes and, respectively, the cathodes during battery operation (or discharge).

In various aspects, the present disclosure provides methods for forming porous lithium manganese oxide thin films having a good electrochemical performance, i.e. electrochemically active lithium manganese oxide thin films or layers, using relatively low cost solution-based deposition techniques. Methods according to certain embodiments of the present disclosure may advantageously be used for depositing such layers conformally.

The electrochemical performance of the lithium manganese oxide thin films formed according to various methods of the present disclosure is as good as the electrochemical performance of lithium manganese oxide thin films formed by known methods. The electrochemical performance may be assessed based on cyclic voltammetry measurements and/or galvanostatic charge-discharge measurements.

Figure 2:
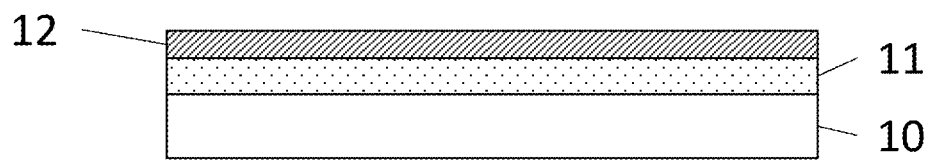
Figure 3:
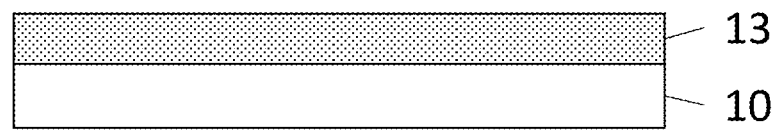
Figure 4:
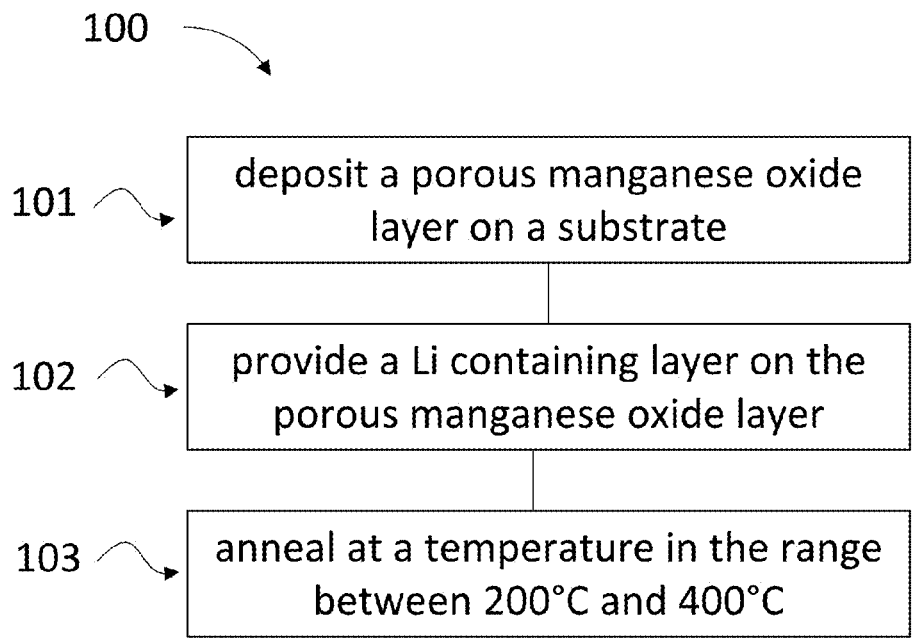

Examples of process steps of a method 100 according to one embodiment of the present disclosure are schematically illustrated in FIG. 1, FIG. 2, FIG. 3 and in FIG. 4.

In a first step 101 (see the flowchart of FIG. 4), a porous manganese oxide layer 11 is deposited, e.g. electrochemically deposited, on a substrate 10 (FIG. 1). The porous manganese oxide layer 11 may, for example, be provided galvanostatically and may, for example, have a porosity in the range between 40% and 60% and/or a pore size in the range between 2 nm and 20 nm, e.g. between 5 nm and 10 nm, the present disclosure not being limited thereto. The thickness of the porous manganese oxide layer 11 may, for example, be in the range between 10 nm and 3 micrometer, for example in the range between 50 nm and 2 micrometer, the present disclosure not being limited thereto. The substrate 10 may comprise a current collector, e.g. a current collector provided on a silicon wafer or on a foil such as a flexible foil. The current collector may for example comprise TiN, carbon, Pt, Ni, Al, stainless steel or carbon nanotubes, the present disclosure not being limited thereto. The thickness of the current collector may, for example, be in the range between 10 nm and 250 nm, the present disclosure not being limited thereto. The current collector may be a multilayer stack, such as, for example, a two-layer stack e.g. comprising a TiN layer coated with a Ni layer.

In the example shown in FIG. 1, FIG. 2, FIG. 3 and FIG. 3, the substrate 10 is a planar substrate. However, the present disclosure is not limited thereto and the substrate may be a non-planar substrate having a topography such as a microstructured surface (3D substrate). For example, a non-planar substrate may comprise a plurality of 3D features or 3D microstructures, such as, for example, a plurality of micro-pillars or a plurality of micro-trenches or a plurality of nanowires or a nanowire mesh. For example, the substrate may comprise an array of high aspect-ratio pillars, such as, for example, silicon pillars, e.g. silicon pillars coated with a current collector layer. The pillars may, for example, have a diameter in the range between 0.5 micrometers and 10 micrometers, a spacing of 1 micrometer to 20 micrometers and a height in the range between 10 micrometers and 200 micrometers, the present disclosure not being limited thereto. Using a substrate comprising a plurality of 3D microstructures can be advantageous in that it can result in an increased battery capacity.

In a next step 102 (FIG. 4), a Li containing layer 12, such as a $Li_2CO_3$ layer, is provided on the porous manganese oxide layer 11 (FIG. 2). Providing the Li containing layer 12 may, for example, comprise, in case of a planar substrate, spin-coating or slot-die coating a Li containing precursor layer and drying. However, the present disclosure is not limited thereto and other suitable methods may be used for providing the Li containing layer 12, such as, for example, spray coating, atomic layer deposition (ALD), blade coating or drop casting. These coating methods can also be suitable for providing the Li containing layer on a 3D substrate.

Next, at step 103 (FIG. 4), an annealing step is done at a temperature in the range between 200° C. and 400° C., for example between 300° C. and 400° C., or between 330° C. and 370° C. This annealing step induces a solid-state reaction between the porous manganese oxide layer 11 and the Li containing layer 12, resulting in the formation of a lithium manganese oxide layer 13 on the substrate 10, as illustrated in FIG. 3. It was surprisingly found that, by selecting the annealing temperature in the range between 200° C. and 400° C., for example between 300° C. and 400° C., or between 330° C. and 370° C., and by selecting an appropriate annealing time, the resulting lithium manganese oxide layer can be a porous layer having a good electrochemical performance. In certain embodiments, the annealing time depends on the annealing temperature: the lower the annealing temperature, the longer the annealing time needed to form a lithium manganese layer with good electrochemical performance. For example, for the higher annealing temperatures an annealing time of a few minutes, e.g. 5 to 10 minutes may be sufficient. For example, for the lower annealing temperatures an annealing time of several hours, e.g. 24 hours may be needed.

In certain embodiments, when using a higher annealing temperature (i.e. higher than 400° C.), a dense lithium manganese oxide layer with a crystalline morphology can be obtained, the layer being substantially non-porous. When using a lower annealing temperature, i.e. lower than 200° C., there may be no lithium manganese oxide formation within a reasonable time frame.

It was found that, in certain embodiments, the lower the annealing temperature, the longer the annealing time needed to obtain a lithium manganese oxide layer with good electrochemical properties. For example, in an experiment wherein annealing was done at 250° C. for 10 minutes with a 70 nm thick porous manganese oxide film, XRD measurements did not reveal any lithium manganese oxide diffraction peak, and the electrochemical performance measured by cyclic voltammetry corresponded to the electrochemical performance of manganese oxide, not to the electrochemical performance of lithium manganese oxide. In another experiment the annealing was done at 250° C. for 24 hours with a 250 nm thick porous manganese oxide film. Based on cyclic voltammetry measurements it was concluded that in this case lithium manganese oxide with good electrochemical performance was formed.

Certain methods of the present disclosure are advantageous in that they allow the formation of a lithium manganese oxide layer having a high porosity and a good electrochemical performance. When using such a layer as an electrode layer in a battery, the porosity of the layer allows a release of the mechanical strain caused by charging and discharging of the battery, thus leading to a reduced risk of crack formation. An additional advantage of a porous electrode layer is that it may enhance the electrode-electrolyte contact area and reduce the diffusion distance for the Li ions.

The substrate used in various methods of the present disclosure may comprise a current collector, for example when the method is used for forming an electrode of a battery. The current collector may for example comprise TiN, carbon, Al, stainless steel, Pt or Ni or a combination thereof, such as for example C coated TiN or Ni coated TiN. In embodiments of the present disclosure wherein an oxidizable material (restrictive material) such as for example TiN or Al is used as a current collector, it may be preferable to avoid electrochemical deposition of the manganese oxide layer directly on the current collector, because it may oxidize during the electrochemical deposition process and as a result electrochemical deposition may be inhibited. In such cases, an additional layer, such as a manganese oxide buffer layer or seed layer formed by other means than by electrochemical deposition, can be provided on the TiN layer before electrochemical deposition of the porous manganese oxide layer. For example, a 1 nm to 10 nm thin, dense manganese oxide buffer layer may be deposited on the TiN layer, e.g., by pulsed laser deposition or by atomic layer deposition. This is further illustrated and described in relation with FIG. 12, FIG. 13, FIG. 14 and FIG. 15.

As described above, in certain embodiments of the present disclosure wherein an oxidizable material such as TiN or Al is used as a current collector, it may be preferable to avoid electrochemical deposition of the porous manganese oxide layer 11 directly on the current collector, because it may oxidize during the electrochemical deposition process. Thus, an additional layer, such as a manganese oxide buffer layer or seed layer formed by other means than by electrochemical deposition, may be provided on the TiN layer before electrochemical deposition of the porous manganese oxide layer 11. For example, a dense manganese oxide buffer layer may be deposited on the TiN or Al layer, e.g., by Pulsed Laser Deposition or by Atomic Layer Deposition. As an alternative to a manganese oxide buffer layer, a Pt, C or Ni layer may be used. However, in some embodiments, a manganese oxide seed layer may be provided in view of the better adhesion obtained for the porous manganese oxide layer.

Figure 12:
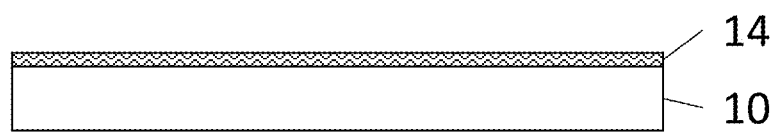
FIG. 12, FIG. 13, FIG. 14 and FIG. 15 illustrate examples of process steps of a method according to one embodiment of the present disclosure.
Figure 13:
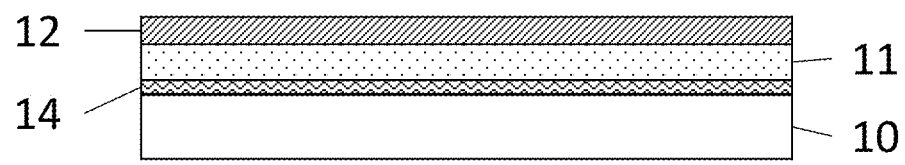
Figure 14:
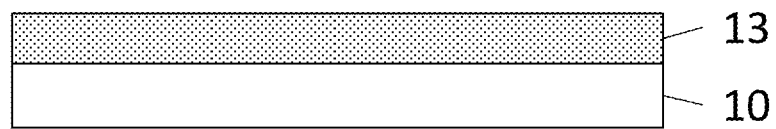
Figure 15:
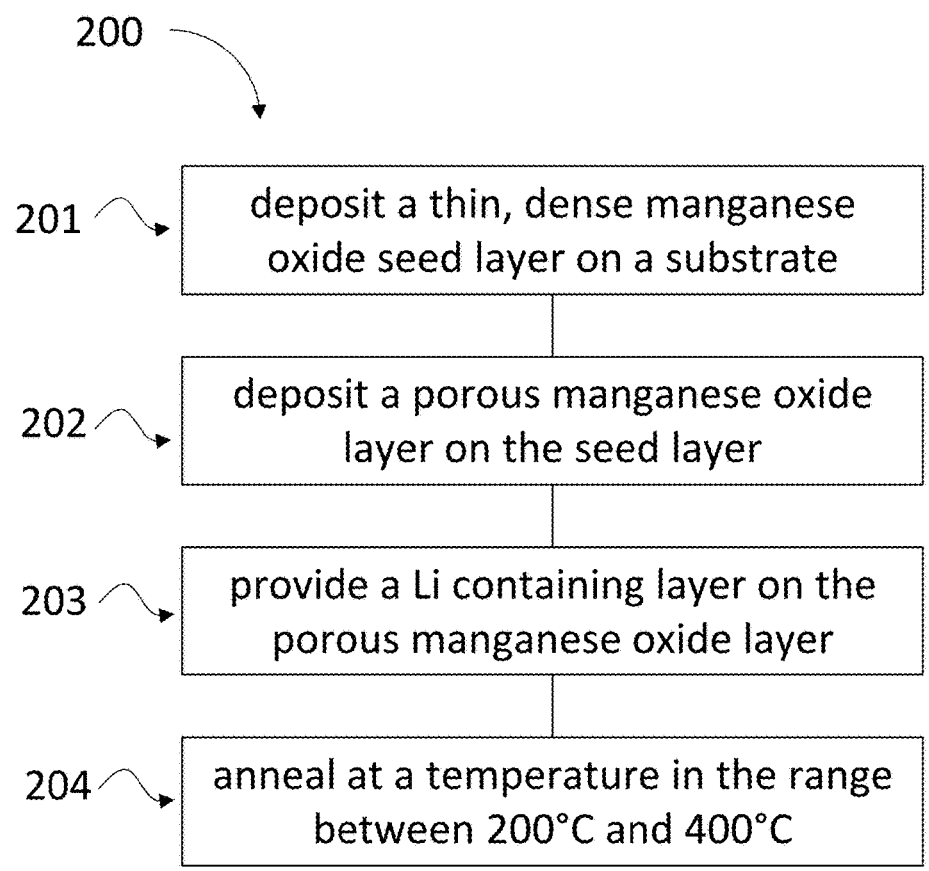

Process steps of an example of a method 200 according to such an embodiment are schematically illustrated in FIG. 12, FIG. 13 and FIG. 14 and in FIG. 15.

In a first step 201 (see FIG. 15) a thin, manganese oxide seed layer 14, e.g. having a thickness in the range between 2 nm and 10 nm, e.g. in the order of 3 nm to 5 nm, is deposited on a substrate 10 (FIG. 12), the substrate 10 for example comprising a current collector such as a TiN or an Al current collector, the current collector being exposed at an upper surface of the substrate 10. Depositing the manganese oxide buffer layer 14 is done by a method other than electrochemical deposition, such as for example Atomic Layer Deposition (ALD) or Pulsed Laser Deposition (PLD). The manganese oxide buffer layer 14 may be a dense, substantially non-porous layer. In the example shown in FIG. 12, FIG. 13 and FIG. 14, the substrate 10 is a planar substrate. However, the present disclosure is not limited thereto and the substrate may be a non-planar substrate having a topography, such as for example a substrate comprising a plurality of micro-pillars or a plurality of micro-trenches.

Next, at step 202 (FIG. 15), a porous manganese oxide layer 11 is electrochemically deposited on the seed layer 14, e.g. manganese oxide seed layer, (FIG. 12) and afterwards (step 203, FIG. 15) a Li containing layer 12, such as a $Li_2CO_3$ layer, is provided on the porous manganese oxide layer 11 (FIG. 13). Providing the Li containing layer 12 may, for example, comprise, in case of a planar substrate, spin-coating or slot-die coating a Li containing precursor layer and drying. However, the present disclosure is not limited thereto and other suitable methods may be used for providing the Li containing layer 12, such as for example spray coating, atomic layer deposition (ALD), blade coating or drop casting. These coating methods are also suitable for providing the Li containing layer on a 3D substrate.

Next, at step 204 (FIG. 14), an annealing step is done at a temperature in the range between 200° C. and 400° C., for example between 300° C. and 400° C., and in some embodiments between 330° C. and 370° C. This annealing step induces a solid-state reaction between the porous manganese oxide layer 11 and the Li containing layer 12, resulting in the formation of a lithium manganese oxide layer 13 on the substrate 10, as illustrated in FIG. 13.

COMPARATIVE EXAMPLE (PRIOR ART)

An experiment was performed wherein a 70 nm thick porous manganese oxide layer was electrochemically deposited on a $Si/SiO_2/Pt$ substrate. A $Li_2CO_3$ film was provided on top of the manganese oxide layer by spin-coating. The $Li_2CO_3$ layer thickness was about 34 nm. Subsequently, the sample was annealed at 750° C. (as typically used in known methods) for 20 minutes in air to induce a solid-state reaction and hence a conversion of the manganese oxide/$Li_2CO_3$ stack to a (50 nm thick) lithium manganese oxide layer. Based on SEM images, it was concluded that the resulting lithium manganese oxide layer is a continuous and dense film with a crystalline morphology. As a reference, a 50 nm thick lithium manganese oxide layer was deposited on a $Si/SiO_2/Pt$ substrate by RF sputtering, followed by annealing at 800° C. for 30 minutes in air.

Figure 5:
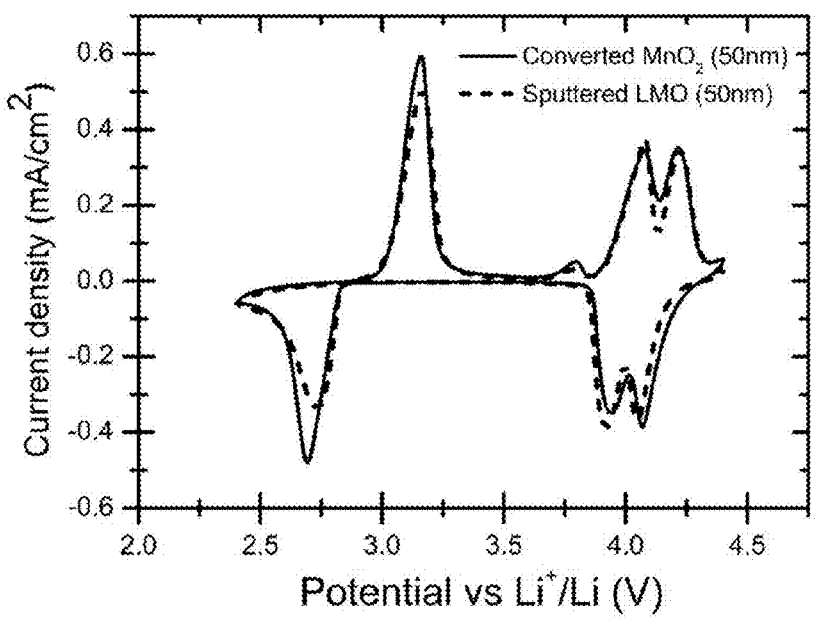
FIG. 5 shows cyclic voltammogram curves measured for crystalline lithium manganese oxide layers fabricated according to prior art methods.

FIG. 5 shows cyclic voltammogram curves measured for the crystalline lithium manganese oxide layer fabricated by solid-state reaction at 750° C. of the manganese oxide/$Li_2CO_3$ stack (full line) and for the lithium manganese oxide layer fabricated by RF sputtering (dashed line). The measurements were performed in a voltage range between 2.2 V and 4.4 V at a scan rate of 10 mV/s. The lithium manganese oxide layer prepared by solid-state reaction at 750° C. shows substantially the same electrochemical performance as the sputtered lithium manganese oxide film.

Figure 6:
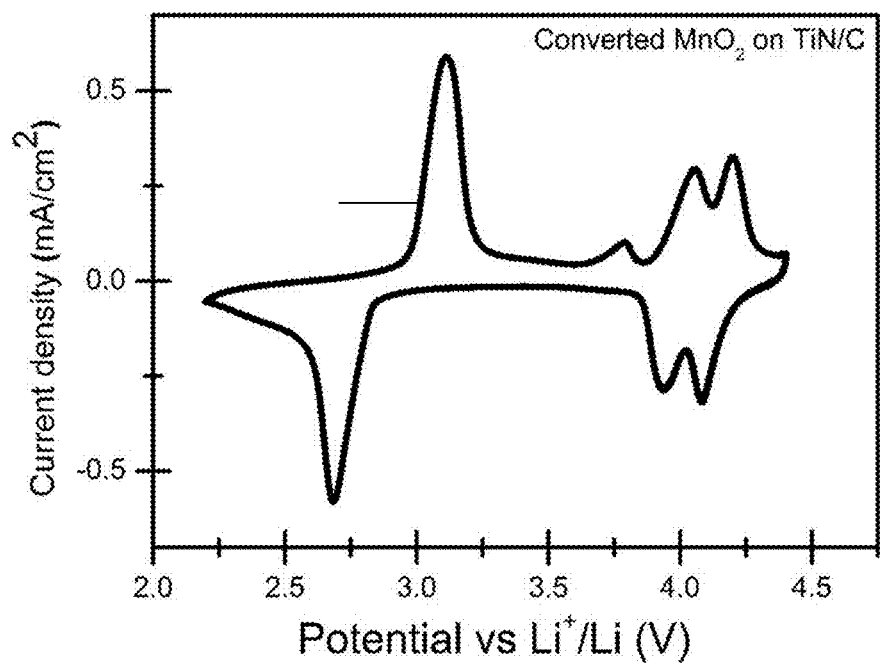
FIG. 6 shows cyclic voltammogram curves measured for a lithium manganese oxide layer fabricated according to one embodiment of a method of the present disclosure.
Figure 7:
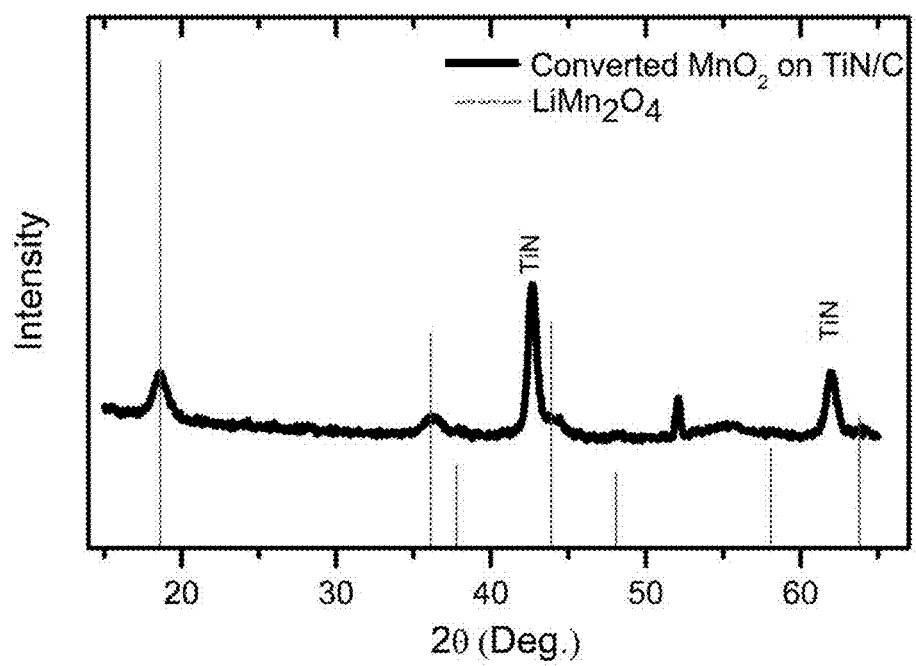
FIG. 7 shows X-ray diffraction patterns measured for a lithium manganese oxide layer fabricated according to one embodiment of a method of the present disclosure.

Example 1: Forming a Lithium Manganese Oxide Layer on a Planar Substrate According to One Embodiment of the Present Disclosure An experiment was performed wherein a lithium manganese oxide layer was formed on a planar $Si/SiO_2/TiN/C$ substrate 10 (with C a graphitic carbon layer) using a method according to one embodiment of the present disclosure. A 70 nm thick porous manganese oxide layer 11 was electrochemically deposited on the substrate 10. On top of the porous manganese oxide layer 11 a 34 nm thick $Li_2CO_3$ film 12 was provided by spin-coating. Then the sample was annealed at 350° C. for 10 minutes in air, thereby forming a lithium manganese oxide layer 13. The lithium manganese oxide layer 13 showed no visible crystalline morphology and was found to be porous. The cyclic voltammogram measured for this layer is shown in FIG. 6. FIG. 7 shows the measured X-Ray Diffraction (XRD) pattern.

The cyclic voltammogram (FIG. 6) of the sample after thermal treatment at 350° C. shows the presence of all the characteristic redox peaks of spinel lithium manganese oxide in the voltage range of 2.2-4.4 V vs $Li^+/Li$. From these results it can be concluded that the lithium manganese oxide layer formed according to certain methods of the present disclosure is electrochemically active and that it has a good electrochemical performance, substantially the same electrochemical performance as lithium manganese oxide layers prepared by prior art methods (shown in FIG. 5). As shown in the XRD pattern (FIG. 7), the characteristic diffraction peaks of spinel lithium manganese oxide are resolved, as are the TiN substrate diffraction peaks.

Figure 8:
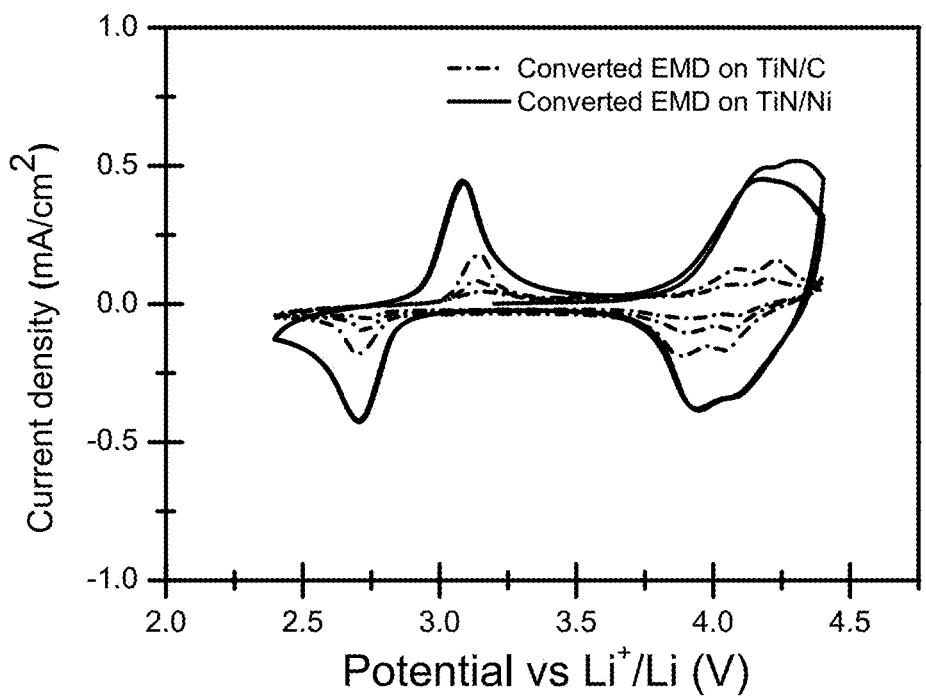
FIG. 8 shows cyclic voltammogram curves measured for a lithium manganese oxide layer fabricated according to one embodiment of the present disclosure, on a Si/SiO$_2$/TiN/Ni planar substrate (full lines) and on a Si/SiO$_2$/TiN/C planar substrate (dash-dotted lines).

In another experiment, a lithium manganese oxide layer 13 was formed on two different planar substrates using a method according to one embodiment of the present disclosure, more in particular on a $Si/SiO_2/TiN/Ni$ planar substrate and on a $Si/SiO_2/TiN/C$ planar substrate (with C a graphitic carbon layer). A 250 nm thick porous manganese oxide layer 11 was electrochemically deposited on the substrate 10. On top of the manganese oxide layer 11 a 120 nm thick $Li_2CO_3$ film 12 was provided by spin-coating. Then the sample was annealed at 350° C. for 2 hours in air, thereby forming a porous lithium manganese oxide layer 13. FIG. 8 shows the cyclic voltammogram measured for these layers: the full lines correspond to the $Si/SiO_2/TiN/Ni$ planar substrate; the dash-dotted lines correspond to the $Si/SiO_2/TiN/C$ planar substrate. Higher current density peaks are observed for the substrate having a Ni top layer (upper layer) than for the substrate having a C top layer. This may indicate that the presence of C reduces the manganese oxide, resulting in a lower amount of lithium manganese oxide being formed. Therefore, a substrate having a Ni upper layer may in some cases be provided instead of a substrate having a C upper layer.

Example 2: Forming a Lithium Manganese Oxide Layer on a Non-Planar Substrate According to One Embodiment of the Present Disclosure An experiment was performed wherein a lithium manganese oxide layer was formed according to one embodiment of the present disclosure on a 3D substrate, i.e. a substrate showing a topography such as a micro-structure or a nano-structure. More in particular, the lithium manganese oxide layer was formed on a substrate comprising a plurality of 50 micrometer high silicon micro-pillars having a circular cross section with a diameter of 2 micrometer, and being provided with 2 micrometer spacing. The use of such high aspect-ratio structures increases the area where the material is deposited, resulting in an increased battery capacity and higher battery power. The silicon micro-pillars were coated with a TiN/Ni layer stack, i.e. the substrate comprises a current collector stack.

Figure 9:
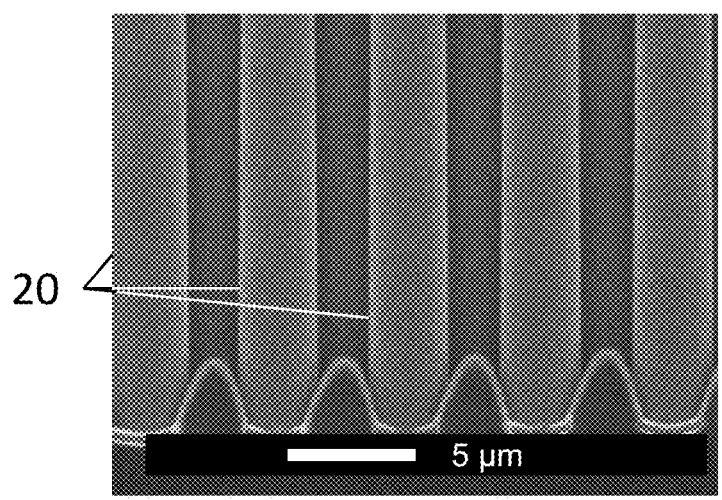
FIG. 9 and FIG. 10 shows SEM pictures of a 200 nm thick manganese oxide layer electrochemically deposited on a substrate comprising high aspect-ratio pillars. The scale bar in FIG. 9 is 5 μm, while the scale bar in FIG. 10 is 500 nm.
Figure 10:
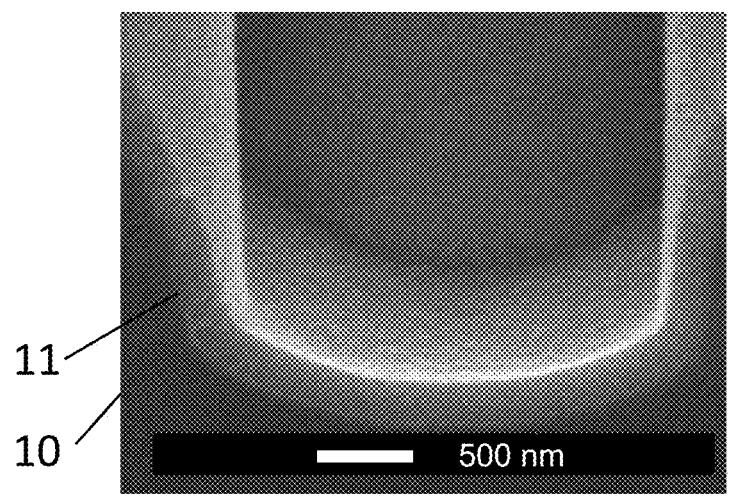

A porous, conformal manganese oxide layer 11 was formed on the Si micro-pillars 20 (Si/SiO$_2$/TiN/Ni substrate with current collector stack, FIG. 9 and FIG. 10) by electrochemical deposition. An electrolyte solution of 0.5 M MnSO$_4$.H$_2$O and 0.5 M CH$_3$COONa with an addition of a small amount of ethanol (about 10 wt %) was used for the electrochemical deposition, with a Ag/AgCl reference electrode and a Pt counter electrode. This is only an example of an electrochemical deposition process that may be used. The present disclosure is not limited thereto, and for example other bath compositions (e.g. other electrolyte solutions) may be used or other deposition methods may be used. The thickness of the manganese oxide layer 11 was about 200 nm. SEM images of the as-deposited manganese oxide layer 11 are shown in FIG. 9, illustrating the good thickness uniformity, i.e. the good conformality, of the manganese oxide layer 11 on the substrate 10 comprising Si pillars 20.

A Li$_2$CO$_3$ layer 12 (thickness about 250 nm) was provided on top of the 200 nm thick porous manganese oxide layer 11 by drop casting, followed by annealing at 350° C. for 120 minutes in air, resulting in the formation of a porous lithium manganese oxide layer 13. After annealing, the sample was rinsed with water in order to remove any eventual excess of Li$_2$CO$_3$.

For purposes of comparison, a lithium manganese oxide layer 13 was formed on a planar substrate 10 in accordance with a method of the present disclosure, by a solid-state reaction between a 200 nm thick manganese oxide layer 11 (same thickness as on the 3D substrate) and a 117 nm thick spin-coated Li$_2$CO$_3$ layer 12 at 350° C. for 120 minutes in air.

Figure 11:
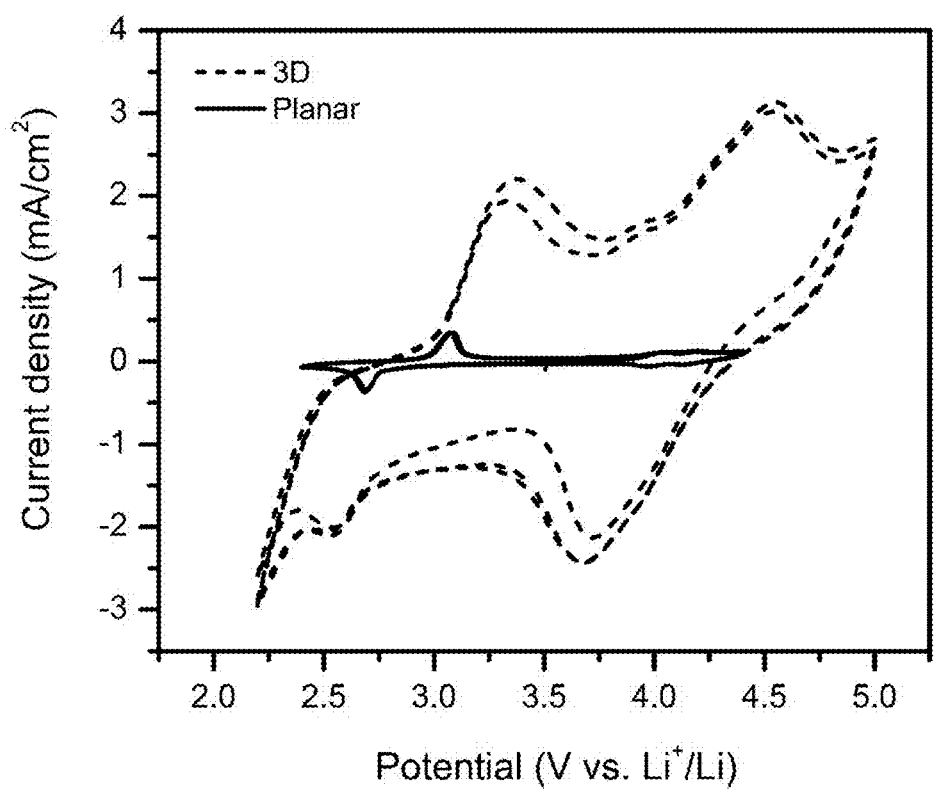
FIG. 11 shows cyclic voltammogram curves of lithium manganese oxide layers formed according to one embodiment of the present disclosure on a non-planar substrate comprising a plurality of micro-pillars (3D, dashed lines) and on a planar substrate (full lines).

FIG. 11 shows the results of cyclic voltammogram measurements of the lithium manganese oxide layers 13 on the non-planar substrate comprising the plurality of silicon micro-pillars 20 (3D, dashed lines) and on the planar substrate (full lines). The cyclic voltammogram of the lithium manganese oxide layer 13 on the 3D substrate shows the redox peaks of lithium manganese oxide and a much higher intensity of the lithiation/delithiation current peaks compared to the lithium manganese oxide layer 13 on the planar substrate with comparable thickness. The enhanced electrochemical performance for the layer deposited on the 3D substrate is due to the increased substrate surface area resulting in an increase of the amount of active material.

Example 3: Forming a Lithium Manganese Oxide Layer on a Restrictive (Oxidizable) Substrate According to One Embodiment of the Present Disclosure Experiments were performed wherein a thin manganese oxide buffer layer 14 (thickness 4 nm to 5 nm) was provided by atomic layer deposition (ALD) on a planar current collector (TiN, Al), followed by electrochemical deposition of a thicker (thickness 370 nm), porous manganese oxide layer 11. As a reference, samples were prepared without such a thin manganese oxide buffer layer, i.e. wherein the electrochemical deposition of the porous manganese oxide layer 11 was done directly on the current collector.

Figure 16:
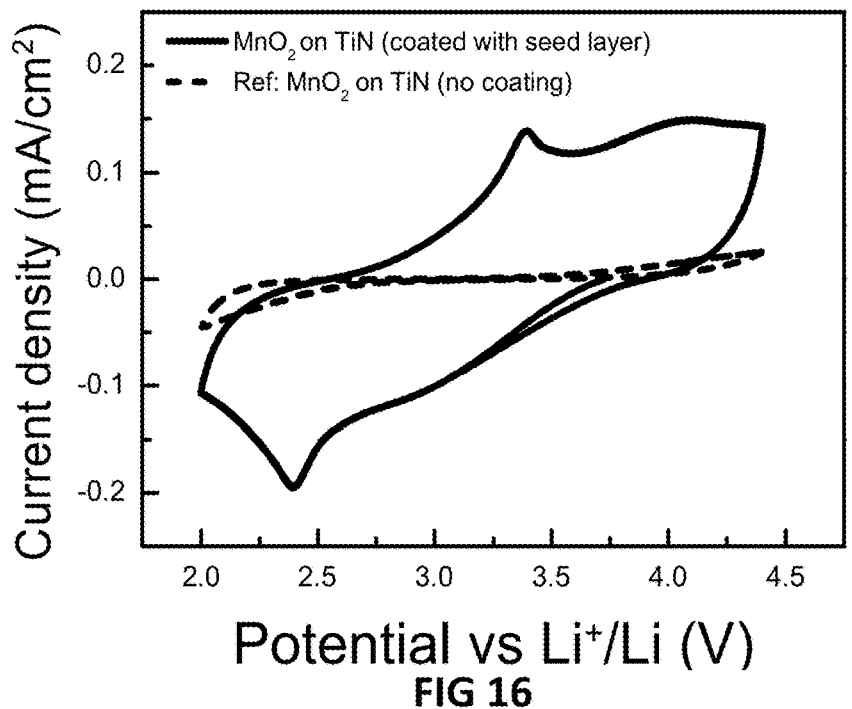
FIG. 16 shows cyclic voltammogram curves for a 370 nm thick manganese oxide layer formed by electrochemical deposition directly on a TiN current collector (dashed lines) and for a manganese oxide layer formed by electrochemical deposition on an ALD MnO$_2$ buffer layer on a TiN current collector (full lines).

FIG. 16 shows cyclic voltammogram curves measured for a porous manganese oxide layer 11 formed by electrochemical deposition directly on a TiN current collector (dashed lines) and for a porous manganese oxide layer 11 formed on an ALD manganese oxide buffer layer 14 on a TiN current collector (full lines). Only for the sample having the ALD manganese oxide seed layer 14 a sufficiently thick porous manganese oxide layer 11 was obtained. When providing the porous manganese oxide layer 11 directly on the TiN current collector by electrochemical deposition (dashed lines) the layer remains thin. It was found that this is due to the formation of a TiON$_x$ layer between the TiN current collector and the electrochemically deposited manganese oxide layer, as a result of the electrochemical deposition process. Such undesirable oxidation leading to the formation of a TiON$_x$ layer may be avoided by first providing the dense manganese oxide seed layer 14 on the current collector layer, according to method 200.

It was further found that providing the manganese oxide seed layer 14 results in a good, improved adhesion of the electrochemically deposited porous manganese oxide layer 11 to the collector layer. More in particular, it was found that thicker porous manganese oxide layers 11, e.g. up to a thickness of 1 micrometer or more, can be electrochemically deposited without delamination on a dense manganese oxide seed layer 14.

A further experiment was done wherein a thin, dense manganese oxide buffer layer or seed layer 14 (thickness 4 nm to 5 nm) was provided by atomic layer deposition (ALD) on a TiN current collector, followed by electrochemical deposition of a 400 nm thick, porous manganese oxide layer 11. In this experiment two different substrates were used, at one hand a planar Si/SiO$_2$/TiN substrate and at the other hand a 3D structured Si/TiN substrate comprising a plurality of 50 micrometer high silicon pillars having a circular cross section with a diameter of 2 micrometer and being provided with 2 micrometer spacing.

Figure 17:
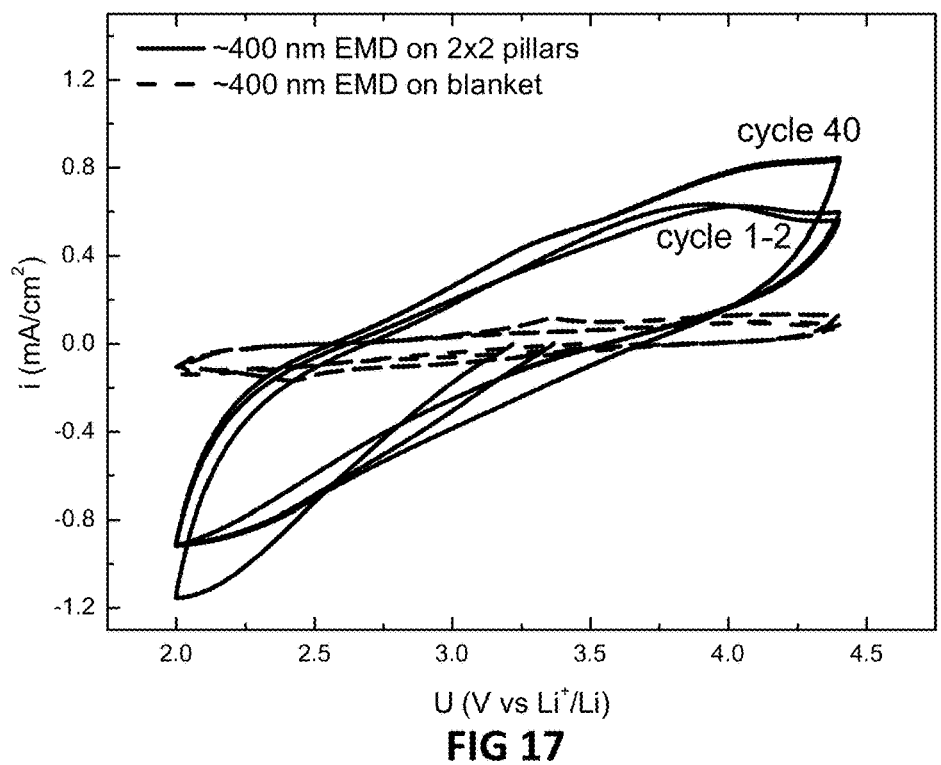
FIG. 17 shows cyclic voltammogram curves for a 400 nm thick manganese oxide layer formed by electrochemical deposition on an ALD MnO$_2$ buffer layer on a TiN current collector, for a planar substrate (dashed lines) and for a 3D structured substrate comprising a plurality of micro-pillars (full lines).

FIG. 17 shows cyclic voltammogram curves for the porous manganese oxide layer 11 formed on the planar substrate (dashed lines) and for the porous manganese oxide layer 11 formed on the 3D structured substrate (full lines). The capacity of the manganese oxide layer was found to be about 6.5 larger on the 3D structured substrate (capacity 31 micro-Ah/cm$^2$) as compared to the capacity of the manganese oxide layer formed on the planar substrate (capacity 4.8 micro-Ah/cm$^2$).

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

Whereas the above detailed description as well as the summary of the disclosure has been focused on a method for fabricating a device, the present disclosure also relates to a device obtained using a method according to any of the embodiments as described above.

While the above detailed description has shown, described, and pointed out novel features of the disclosure as applied to various embodiments, it will be understood that various omissions, substitutions, and changes in the form and details of the device or process illustrated may be made by those skilled in the technology without departing from the disclosure.

What is claimed is:
1. A method for forming a porous, electrochemically active lithium manganese oxide (Li$_x$Mn$_y$O$_z$) layer on a substrate, the method comprising:
depositing a porous manganese oxide layer on the substrate;

providing a Li containing layer on the porous manganese oxide layer; and afterwards performing an annealing step at a temperature in the range between 200° C. and 400° C., thereby inducing a solid-state reaction between the porous manganese oxide layer and the Li containing layer.

2. The method according to claim 1, wherein the lithium manganese oxide layer has a spinel structure.

3. The method according to claim 1, wherein the lithium manganese oxide layer is a $Li_xMn_yO_z$ layer with x in the range between 0 and 2, y=2 and z in the range between 1.8y and 2.2y.

4. The method according to claim 1, wherein the porous manganese oxide layer is a porous $MnO_vO_w$ layer with v=1 and w in the range between 1.9 and 2.1.

5. The method according to claim 1, wherein the porous manganese oxide layer has a porosity in the range between 40% and 60%.

6. The method according to claim 1, wherein the porous manganese oxide layer comprises pores having a pore size in the range between 2 nm and 20 nm.

7. The method according to claim 1, wherein providing the Li containing layer comprises providing a $Li_2CO_3$ layer.

8. The method according to claim 1, wherein the substrate is a non-planar substrate.

9. The method according to claim 8 wherein the substrate comprises a plurality of high aspect-ratio micro-pillars and/or a plurality of high aspect-ratio micro-trenches, each having an aspect ratio in the range of 20 to 250.

10. The method according to claim 1, wherein the substrate comprises Al.

11. The method according to claim 1, wherein depositing the porous manganese oxide layer on the substrate comprises electrochemically depositing the porous manganese oxide layer.

12. The method according to claim 11, further comprising, before electrochemically depositing the porous manganese oxide layer depositing a seed layer on the substrate.

13. The method according to claim 12, wherein depositing the seed layer comprises depositing a dense manganese oxide layer by means of a method different from electrochemical deposition.

14. The method according to claim 1, wherein
the lithium manganese oxide layer is a $Li_xMn_yO_z$ layer with x in the range between 0 and 2, y=2 and z in the range between 1.8y and 2.2y;
the porous manganese oxide layer is a porous $MnO_vO_w$ layer with v=1 and w in the range between 1.9 and 2.1;
the porous manganese oxide layer has a porosity in the range between 40% and 60%; and
the porous manganese oxide layer comprises pores having a pore size in the range between 2 nm and 20 nm.

15. The method according to claim 14, wherein the lithium manganese oxide layer has a spinel structure.

16. A method for fabricating a lithium-ion battery, wherein the method comprises forming a porous, electrochemically active lithium manganese oxide electrode layer on a substrate, using a method according to claim 1.

17. The method according to claim 1, wherein the porous, electrochemically active lithium manganese oxide layer is conformally provided on said substrate, the substrate not withstanding temperatures higher than 700° C.

18. A method for fabricating lithium-ion battery, wherein the method comprises forming a porous, electrochemically active lithium manganese oxide electrode layer on a substrate, using a method according to claim 17.

19. The method according to claim 1, wherein the annealing is performed in air or in an inert atmosphere.

20. The method according to claim 1, wherein the annealing is performed in the absence of further deposition.

* * * * *